United States Patent [19]

Stahl

[11] 3,809,495
[45] May 7, 1974

[54] TURBINE ROTOR HAVING CUSHIONED SUPPORT SURFACES FOR CERAMIC BLADES MOUNTED THEREON

[75] Inventor: William F. Stahl, Media, Pa.

[73] Assignee: Westinghouse Electric Corporation, Pittsburgh, Pa.

[22] Filed: Mar. 27, 1973

[21] Appl. No.: 345,391

[52] U.S. Cl.................. 416/135, 416/221, 416/241
[51] Int. Cl............................................... F01d 5/30
[58] Field of Search..................... 416/135, 221, 241

[56] References Cited
UNITED STATES PATENTS

| | | | |
|---|---|---|---|
| 2,317,338 | 4/1943 | Rydmark | 416/221 |
| 2,595,829 | 5/1952 | Dean | 416/221 |
| 3,313,519 | 4/1967 | Jenson | 416/221 |

FOREIGN PATENTS OR APPLICATIONS

| | | | |
|---|---|---|---|
| 1,045,730 | 12/1958 | Germany | 416/221 |
| 280,221 | 2/1928 | Great Britain | 416/135 |
| 664,986 | 1/1952 | Great Britain | 416/241 |
| 836,030 | 6/1960 | Great Britain | 416/241 |
| 151,575 | 9/1955 | Sweden | 416/241 |

*Primary Examiner*—Everette A. Powell, Jr.
*Attorney, Agent, or Firm*—D. N. Halgren

[57] ABSTRACT

A turbine rotor or disc having ceramic blades mounted thereon. The rotor or disc has a plurality of spaced channels or apertures on its periphery for receiving the roots of the blades. The channels or apertures are serrated to provide compliant or yeildable supports for the roots of the blades.

7 Claims, 5 Drawing Figures

PATENTED MAY 7 1974          3,809,495

TURBINE ROTOR HAVING CUSHIONED SUPPORT SURFACES FOR CERAMIC BLADES MOUNTED THEREON

BACKGROUND OF THE INVENTION

1. Field of the Invention

This invention relates generally to turbomachines, and particularly to an arrangement for providing a compliant or cushion mounting for attaching ceramic blades to a disc or rotor.

2. Description of the Prior Art

It is known that the thermal efficiency and power output of a turbine depends upon the temperature of the operating fluid. Usually the higher the temperature of the operating fluid, the higher the thermal efficiency of the turbine. The main limiting factor, however, in raising the turbine efficiency and power output, is the physical capacity of the rotating blades. Turbine blades made from high-temperature resistant superalloys withstand temperatures of approximately 1,800°-2,000°F. Advances in ceramics, specifically silicon nitride ($Si_3N_4$) and silicon carbide (SiC) will allow initial turbine temperatures in the 2,300°-2,600°F range. Ceramics, however, are not as compliant as metals. Any introduction of tensile stresses in critical areas may propagate cracks in ceramics, and the blade will fail. Therefore, in the design of the blade and rotor channels one must generally try to minimize tensile stresses when adapting the blades to the rotor. Some turbine designers have cushioned the area of contact between the ceramic blade roots and the channels in the rotor by the use of an intermediate layers of woven or felted metal, by a ceramic fiber, or asbestos cloth. This type of sandwich padding is undesirable because it does not provide uniform support to the blade root. Slippage loss of the material, localized stress overloading, matting, and pulverization are possible with an intermediate material. These are the objections to a sandwich arrangement because they present potentially dangerous situations when used with ceramic blades.

SUMMARY OF THE INVENTION

The present invention provides a simple, economical, effective, easily manufacturable arrangement for mounting ceramic turbine blades on a rotor. The rotor groove provides a cushioned or yieldable support for the roots of each of the blades. The cushioning is accomplished by providing serrated contact surfaces in the channel that holds the turbine blade to the rotor or disc. These serrated surfaces contact the blade root and provide a compressive force on the root during rotor rotation.

The serrations are fine grooves that are provided in the channels in the rotor which receive the blade roots. These serrations may be of a variety of shapes and designs. The serrations may criss-cross each other, or lie parallel to one another. The peaks on the serrations will yield under the compressive force of the blade root during turbine operation. This yielding of the peaks on the serrations provides a deformed cushioned and yieldable surface on which the hard ceramic surface of the root is supported. The serrations, thus provide a uniform load bearing, yet complaint yieldable surface to support the blade roots.

DESCRIPTION OF THE PREFERRED EMBODIMENTS

Figure 1:
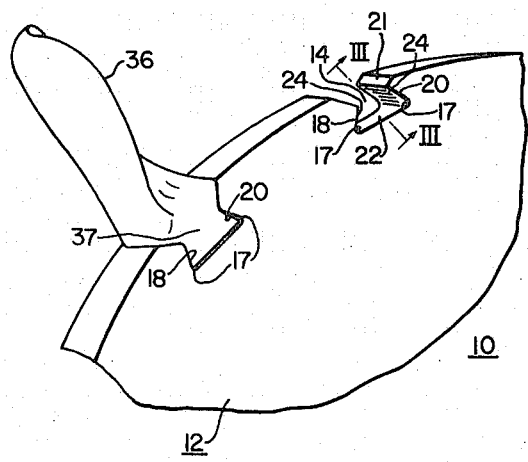
FIG. 1 is a fragmentary elevational view of a turbine rotor incorporating this invention.
Figure 2:
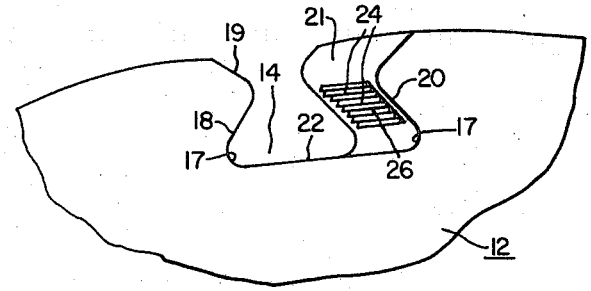
FIG. 2 is a fragmentary perspective view of one of the channels in the rotor, showing the compliant support for a blade root.

Referring to the drawings, particularly FIGS. 1 and 2, the structure shown therein comprises a portion of an axial flow gas turbine 10 which includes a rotor or disc 12 having an annular array of spaced channels or apertures 14 formed in its periphery. The channels 14 are undercut, and are generally of dovetail form. More precisely, the channels 14 have generally converging sidewall portions 18 and 20 that blend through curved sections 17 from a generally circumferentially disposed base portion 22 in each of the channels 14. The converging sidewall portions 18 and 20 turn generally away from each other and form a pair of generally diverging sidewall portions 19 and 21 adjacent the rotor 12 periphery. The converging sidewall portions 18 and 20 each have disposed thereon a pattern of serrations or microgrooves 24 formed on their surfaces. The serrations 24 are deformable and will yield when a load is applied against them. These serrations 24 can be machined into channel 14 of the rotor 12 by milling, electrochemical machining, knurling or chiseling.

FIG. 2 discloses a parallel array of serrations 26 formed in each of the converging sidewall portions 18 and 20 of channel 14, wherein each individual deformable groove 24 is linear and parallel to each of the other grooves in the array of serrations 26.

Figure 3:
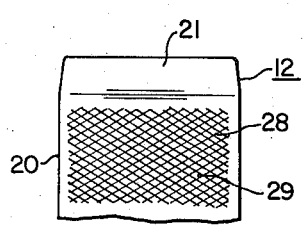
FIG. 3 is a sectional view taken along lines III—III of FIG. 1.

The serrations 24 may be formed in a cross-cut pattern 28 on the converging sidewall portions 18 and 20 of channel 14 as shown in FIG. 3. This non-parallel array of serrations 28 produces a plurality of deformable peaks 29 as contrasted with the parallel array of serrations 26 that form a plurality of deformable linear ridges 24, as shown in FIG. 2.

Figure 4:
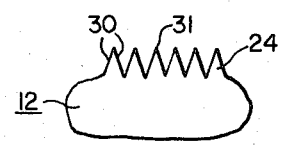
FIG. 4 is a cross-sectional view of another alternative embodiment of the serrations; and, FIG. 5 is a cross-sectional view of still another alternative embodiment of the serrations.
Figure 5:
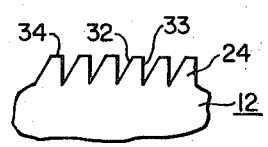

The serrations 24 may have alternate forms. They may have equiangular or equally inclined sloping surfaces 30 meeting at a point 31 as shown in FIG. 4, or they may have a pair of sloping surfaces 32 and 33 that are not equiangular, but may have a truncated apex 34, as shown in FIG. 5.

The channels 14 on the periphery or rotor 12 support and retain a plurality of ceramic turbine blades 36 having root portions 37. Most ceramic materials, as exemplified by those used in turbine blades, silicon nitride $Si_3N_4$ or silicon carbide SiC, have the ability to withstand higher temperatures than metals, and most ceramic materials are relatively stronger in a compressive loading than are metals. Unfortunately, ceramics are generally weaker than metals when subjected to a tensile loading. For this reason, the sidewalls 18 and 20 of the channels 14 are angled to induce a generally compressive force in the root portions 37 of the ceramic blades 36. An overloading of tensile or shear forces in critical areas in the ceramic blades 36 would cause cracking in the ceramic material and the blades 36 would fail.

To reduce or attempt to minimize the failure of ceramic blades due to cracking of the ceramic material induced by an overloading of tensile and shear forces in critical areas of the blade root, a cushioning or yieldable support surface 24 is formed in the channel walls for the root portions of the blade. The cushioning surfaces in the channel walls will yield and provide a "seat" of deformed serrations for the blade roots. The blade roots are forced against the channel walls by centrifugal forces generated in the blade by rotor rotation. The compliant surfaces in the channel walls therefore reduce the non-compressive forces that could destroy the ceramic blade and damage the turbine.

From the foregoing description it is apparent that the invention provides an improved arrangement for a compliant surface in which a ceramic blade root will be held in a compressed state against the restraining converging walls of the channel in the rotor during turbine operation, and the channel serrated surface will yield accordingly to provide a uniform cushioned support surface for the root configuration.

What I claim is:

1. A turbine rotor assembly comprising a rotor, said rotor having a plurality of channels provided therein and spaced along its periphery, said channels having serrations therein, and a plurality of blades, said blades each having a root portion corresponding in configuration to said channels in said rotor, said root portions being disposed in said channels, said serrations in said channels providing a yieldable support means for said root portions of said blades.

2. A turbine rotor assembly as claimed in claim 1 wherein said channels have a generally circumferentially disposed base surface, generally converging inclined side wall portions, each of said converging side wall portions extend through a curvilinear wall section adjacent said base, other side wall portions generally diverging from each other near the periphery of said rotor, said serrations being generally disposed on the converging portions of the side walls.

3. A turbine rotor assembly as claimed in claim 1, wherein said blade is constructed of ceramic material.

4. A turbine rotor assembly as claimed in claim 1, wherein said serrations are parallel to one another, said serrations having sloping surfaces with equal inclinations.

5. A turbine rotor assembly as claimed in claim 1, wherein said serrations are parallel to one another, said serrations having truncated apexes and sloping surfaces with different inclinations.

6. A turbine rotor assembly as claimed in claim 4, wherein said serrations have a cross-cut pattern.

7. A turbine rotor assembly as claimed in claim 5, wherein said serrations have a cross-cut pattern.

* * * * *